United States Patent [19]

Dalton et al.

[11] 4,312,417
[45] Jan. 26, 1982

[54] HAND TRUCK EMPLOYING WHEEL UNITS HAVING MULTIPLE WHEELS

[76] Inventors: Todd E. Dalton; Ronald V. Dalton, both of 3801 Chestnut Ave., Long Beach, Calif. 90807

[21] Appl. No.: 96,250

[22] Filed: Nov. 20, 1979

[51] Int. Cl.³ .............................................. B62B 5/02
[52] U.S. Cl. ..................................................... 180/8 A
[58] Field of Search ....................... 180/8 A; 280/5.26

[56] References Cited

U.S. PATENT DOCUMENTS

| | | | |
|---|---|---|---|
| 2,400,824 | 5/1946 | Jackson | 180/8 A |
| 2,931,449 | 4/1960 | King | 180/8 A |
| 3,450,219 | 6/1969 | Fleming | 180/8 A |
| 3,512,658 | 5/1970 | Harlan | 180/9.22 X |
| 3,698,501 | 10/1972 | Gross | 180/8 A |

FOREIGN PATENT DOCUMENTS

| | | | |
|---|---|---|---|
| 2124284 | 11/1972 | Fed. Rep. of Germany | 180/8 A |
| 1310268 | 10/1962 | France | 180/8 A |
| 58008 | 9/1967 | German Democratic Rep. | 180/8 A |

Primary Examiner—John A. Pekar
Attorney, Agent, or Firm—Edward D. O'Brian

[57] ABSTRACT

A hand truck which is especially useful in moving loads up and down stairways can be constructed so as to employ two identical wheel units located adjacent to the lower end and at the back of the body or frame of the hand truck. Each of the wheel units consists of a center hub section and a plurality of arms, each of which carries a rotatably mounted wheel. The wheel units are mounted for rotation about an axis; a motor is provided for simultaneously rotating the wheel units.

1 Claim, 8 Drawing Figures

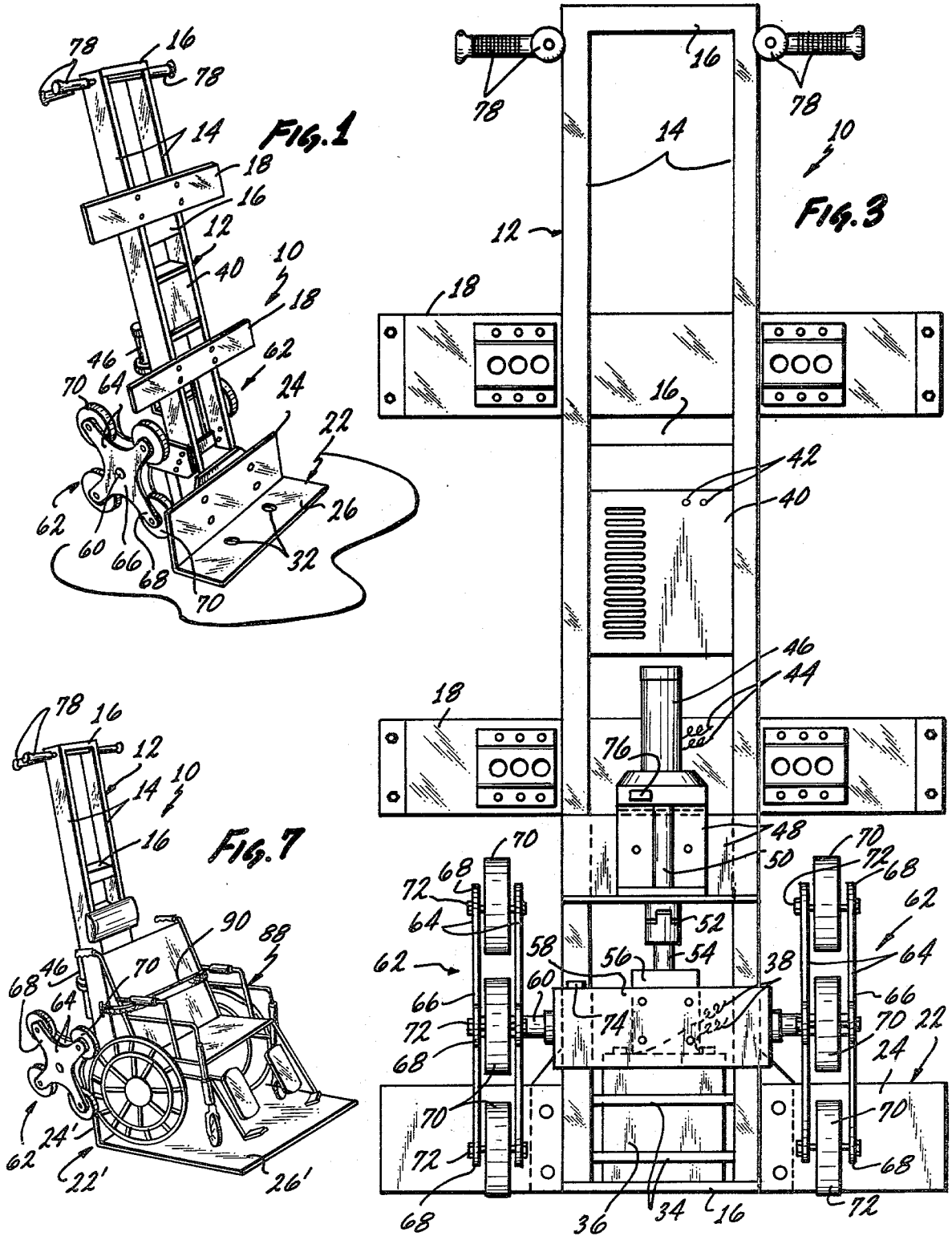

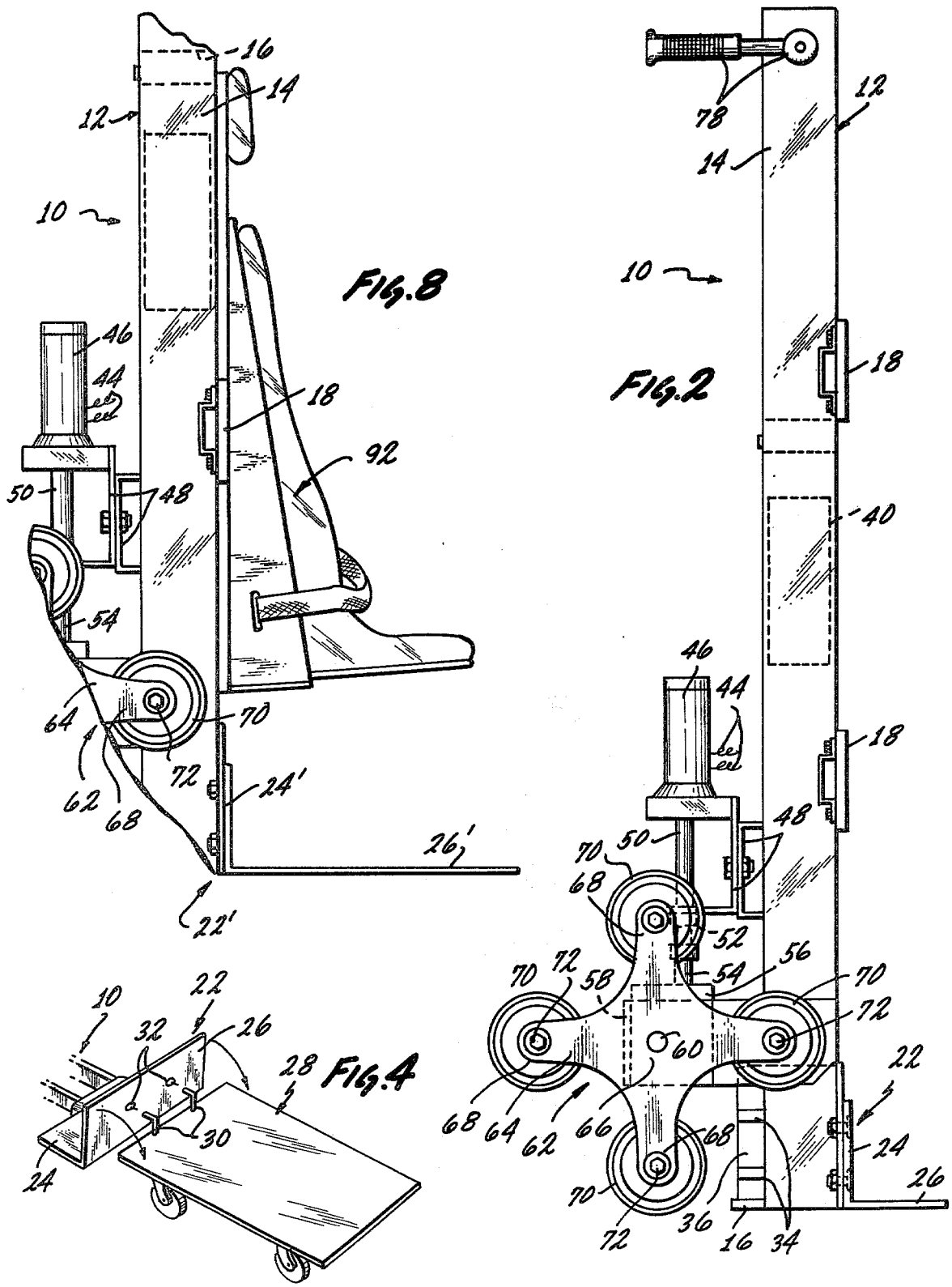

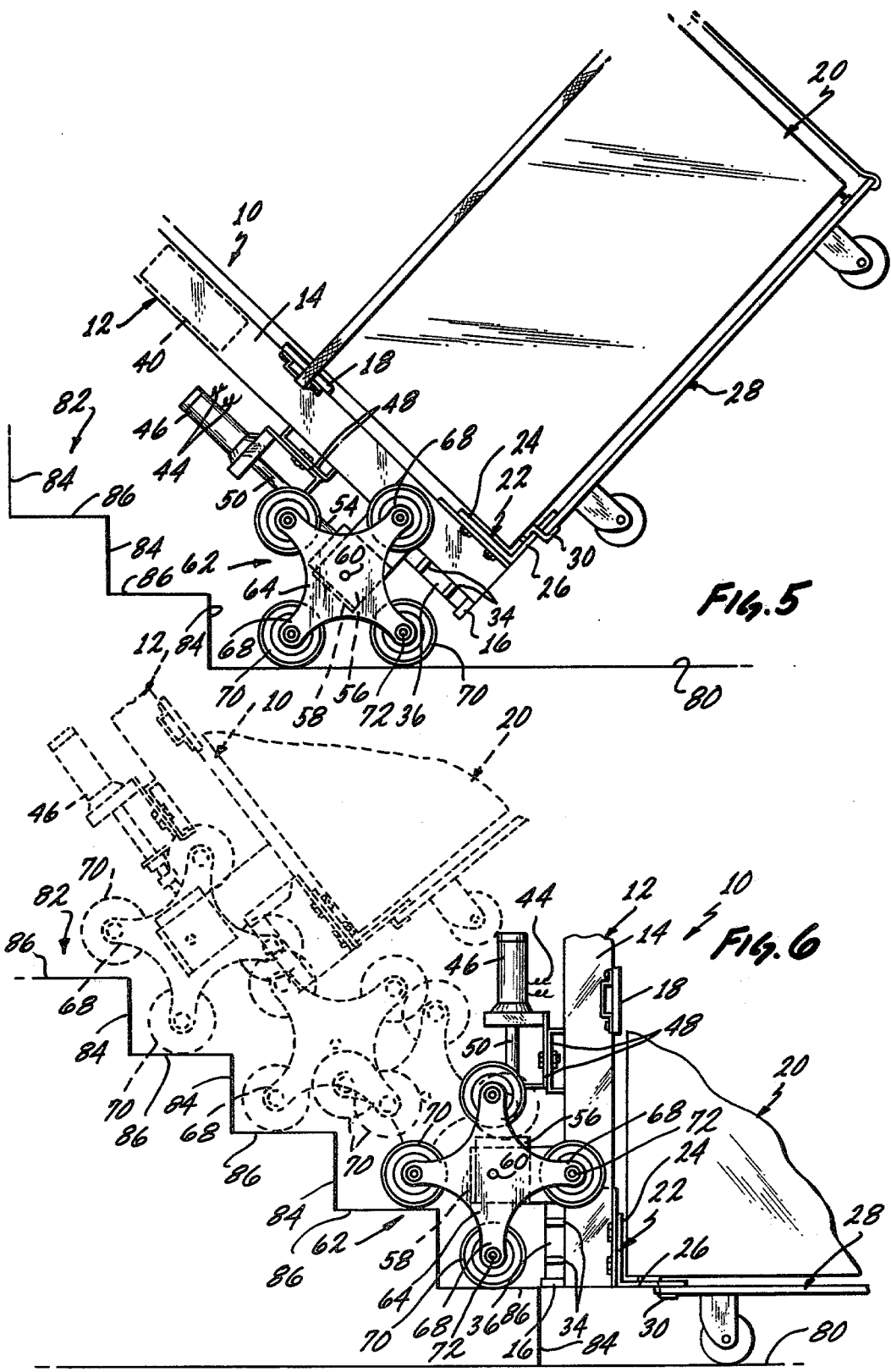

HAND TRUCK EMPLOYING WHEEL UNITS HAVING MULTIPLE WHEELS

BACKGROUND OF THE INVENTION

The invention set forth in this specification pertains to new and improved hand trucks. More specifically it pertains to new and improved hand trucks which are constructed so as to employ wheel units having multiple wheels. The use of such wheel units makes the hand trucks of the present invention especially desirable for use in moving loads both upon a horizontal surface and in moving loads up and down stairs.

Most conventional hand trucks are constructed so as to utilize an elongated, normally vertically extending body or frame carrying at its lower end a toe plate extending from the front of the frame and carrying wheels or wheel means generally at each side of the frame and adjacent to the back of the frame adjacent to the lower end of the frame. Such a hand truck normally includes handles or handle means attached to the frame adjacent to or at the upper end of the frame for use in manipulating the hand truck and, when a load is carried upon it, the hand truck and the load from one location to another. Such conventional hand trucks have been employed for many years in many different applications and are satisfactory for many different uses.

During the normal use of such a conventional hand truck an object or load is located on the toe plate of the hand truck generally adjacent to or against the frame or body and the hand truck is tilted back as it is supported by the handles so that the weight supported by the wheels is reasonably "balanced" relative to the wheels as the hand truck is thereafter moved and/or manipulated. Frequently there is a problem in maintaining such a "balance" with a hand truck. Also on occasion the movement of such a hand truck as, for example, in moving the hand truck up or down a flight of stairs or over a curb can be a significant problem.

As a result of the recognition of such problems a large number of different hand truck constructions have been proposed to facilitate the manipulation and movement of a hand truck in transporting loads both upon vertical surfaces and up and down stairs. It is not considered that an understanding of the present invention requires any sort of a discussion of the various expedients which have been proposed and to various extents used to facilitate the use of a hand truck in moving loads. Many of such expedients have proved reasonably desirable and utilitarian. In spite of this it is considered that there is still a need for new and improved hand trucks for use in moving loads of various different types either along a generally vertical surface or up and down various types of stairs or related structures.

SUMMARY OF THE INVENTION

A broad object of the present invention is to fulfill the need indicated in the preceding discussion. More specifically the present invention is intended to provide new and improved hand trucks which can be constructed at a comparatively nominal cost, which can be easily and conveniently utilized in moving various different types of loads both along a generally horizontal surface (including surfaces with various obstructions located thereon) which can be utilized in moving such loads up and down stairs and which are of such a character that they are capable of prolonged, reliable service with minimal maintenance.

In connection with such movement of a load it is considered that it is particularly important that the invention is directed towards hand trucks which can be utilized in moving loads without there being any significant or material danger of such loads being damaged as, for example, when such a hand truck might tip over in being manipulated or moved from one location to another.

In accordance with this invention these and various related objectives of the invention as will be apparent from a consideration of the remainder of this specification are achieved in a hand truck having an elongated, vertically extending body, said body having upper and lower ends, a front and a back, toe plate means attached to said body at the front thereof adjacent to the lower end thereof, wheel means for supporting said body connected to said body adjacent to the lower end thereof and adjacent to the back thereof and handle means connected to said body adjacent to the upper end thereof for use in manipulating said hand truck in which the improvement comprises: said wheel means consisting of two separate identical wheel units, one of said wheel units being located adjacent to one side of said body and the other of said wheel units being located adjacent to the other side of said body, eac of said wheel units consisting of a centrally located hub section, a plurality of arms spaced from one another so as to extend outwardly from said hub section, and a wheel rotatably mounted on each of said arms, means connecting said hub sections of said wheel units so that said wheel units are both capable of rotating about an axis, said wheels being spaced equidistant from one another around said axis and equidistant from said axis, said wheels also being mounted on said arms so as to be capable of rotating about individual axes which are parallel to said axis, said wheels being located with respect to said axis and said arms and said wheels being dimensioned so that during the use of said hand truck separate wheels on each of said wheel units are capable of being engaged by the riser and tread of a stair and so that when said wheel units are so engaged said wheel units can be rotated about said axis so as to locate other wheels on said wheel units on an adjacent tread of said stair.

BRIEF DESCRIPTION OF THE DRAWINGS

Because of the nature of this invention it is considered that it is best more fully described with reference to the accompanying drawings in which:

FIG. 1 is an isometric view showing the front and one side of a presently preferred embodiment or form of a hand truck in accordance with this invention;

FIG. 2 is a side elevational view at an enlarged scale showing the side of this hand truck visible in FIG. 1;

FIG. 3 is a rear elevational view of the hand truck shown in FIG. 1 at the same scale as FIG. 2;

FIG. 4 is an isometric, exploded view indicating how a dolly may be utilized with and as a part of the hand truck illustrated in the preceding figures;

FIG. 5 is a side elevational view illustrating a hand truck as indicated in the preceding figures used with a dolly as indicated in FIG. 4 in transporting a load along a vertical surface toward a stair;

FIG. 6 is a view corresponding to FIG. 5 in which the hand truck is shown supporting a load and with wheels on the wheel units located with respect to lower treads of a stair and in which various positions of the wheel units and the hand truck and load in movement of the hand truck up the stairs are indicated in phantom;

FIG. 7 is an isometric view showing the use of a hand truck as indicated in FIG. 1 in moving a wheelchair as a load;

FIG. 8 is a partial side elevational view reasonably corresponding to FIG. 2 showing how the hand truck of the present invention may be used with a seat so that an individual may be moved as a load.

The drawings are presently intended for use in explaining the present invention. Because of the purpose of these drawings various details which are considered to be within routine engineering skill or knowledge have not been illustrated in them. The various concepts embodied within the structure shown which are set forth and defined in the appended claims are obviously capable of being utilized in a wide variety of somewhat differently appearing and differently constructed hand trucks through the use or exercise of routine engineering skill.

DETAILED DESCRIPTION

In the drawing there is shown a hand truck 10 constructed so as to include a body or frame designated generally by the numeral 12. This body or frame 12 is constructed so as to utilize parallel, normally vertically extending rails 14 connected by cross-members 16 joining these rails 14 into a rigid unit. If desired, various elongated supports 18 may be secured to the rails 14 so as to extend outwardly from them for use in helping to support a load 20 such as is shown in FIGS. 5 and 6 upon the frame 12.

Normally a conventional complete toe plate 22 as shown in FIG. 1 of the drawings will be secured to the rails 14 in a conventional manner so that a back wall 24 of the complete toe plate 22 is secured to the rails 14 in such a manner as to hold a bottom wall or toe plate 26 so that it extends substantially perpendicularly from the rails 14 immediately adjacent to the lower ends (not separately numbered) of the frame 12. If desired, various different types of toe plates corresponding to the toe plate 22 may be substituted for this toe plate 22.

As an example of this in FIGS. 7 and 8 a modified complete toe plate 22' is shown which utilizes a back wall 24' which is the same as the back wall 24 and which utilizes in addition an elongated bottom wall 26' corresponding to the wall or plate 26 which is shaped essentially as a platform. In some circumstances it may be desired to mount small wheels on or along this wall 26'. If desired a wheeled dolly 28 may be secured to the toe plate 26 by inserting angled rods or brackets 30 into holes 32 in the plate 26 as indicated in FIG. 4 and as shown in FIGS. 5 and 6 of the drawings. When a dolly 28 is used in this manner it in effect becomes an extension of the plate 26.

The hand truck 10 is also constructed so as to include holders 34 for use in holding a conventional battery 36 generally upon the lowermost of the cross-members 16 generally between the rails 14. It is considered desirable to mount the battery 36 in this position since this tends to concentrate the weight of the battery as low as reasonably possible in the hand truck 10. This is considered to facilitate the use of the hand truck 10 without danger of the hand truck 10 becoming so unbalanced as to tend to tip over when it is used in moving a load. Further, in this location the battery 36 is protected against inadvertent damage because it is immediately behind the back wall 24 and between the rails 14.

This battery 36 is connected by conventional wires 38 which may be conveniently located within one of the rails 14 to a switch box 40 mounted between the rails 14 at a height such that it can be conveniently reached during utilization of the hand truck 10. Appropriate conventional controls 42 may be mounted on the switch box 40 (or elsewhere) so that a conventional internal mechanism (not shown or described) within the box 40 may be utilized to regulate the flow of current from the battery 36 supplied to the switch box 40 by the wires 38 to other wires 44 in order to operate and to control the operation of an electric motor 46.

This motor 46 is preferably mounted upon a bracket 48. This bracket 48 is supported on the rails 14 at the back (not separately numbered) of the frame 12 in such a position that the shaft 50 of the motor 46 extends generally downwardly and parallel to the rails 14. This shaft 50 is coupled by means of a conventional flexible coupling 52 intended to accommodate any possible misalignment problems to the input shaft 54 of a conventional gear box 56. This gear box 56 is mounted on the rails 14 of the frame 12 through the use of other mounting brackets 58 reasonably adjacent to but spaced from the lower end (not separately numbered) of the frame 12.

An output shaft 60 extends from the gear box 56 transverse to the rails 14, generally parallel to the complete toe plate 22 and generally outwardly from the sides (not separately numbered) of the frame 12. The gear box 56 is located by the brackets 58 sufficiently far from the rails 14 so as to accommodate movement and operation of two separate identical wheel units 62 employed with the hand truck 10.

The wheel units 62 may be constructed in a number of different manners. In the hand truck 10 each of these wheel units 62 is constructed so as to utilize two separate, identical plates 64. Each of the plates 64 includes a centrally located hub-like section or hub 66 which is mounted at its center on the shaft 60. Each of the plates 64 also includes arms 68 extending radially from its hub or hub section 66. These arms 68 are spaced equally from one another around the axis (not shown) of the output shaft 60 and are all equal length. In each wheel unit 62 separate wheels 70 are rotatably mounted about a shaft 72 extending between adjacent arms 68 on the two adjacent plates 64. These shafts 72 all extend parallel to the shaft 60 and are located equidistant from the shaft 60.

In effect, each of the wheel units 62 consists of an assembly of two of the plates 64 and the associated shafts 72 and wheels 70. Because of the construction used in effect each of the wheel units 62 may be considered as having a single hub or hub section 66 and single arm 68 supporting each of the various wheels 70 and shafts 72 described.

It is noted that the wheel units 62 are dimensioned and mounted in such a manner that when arms 68 on the units 62 extend vertically, generally parallel to the frame 12 the wheels 70 are located on back of the units 62 so as to extend substantially to the plane of the bottom wall 26 of the toe plate 22. The wheel units 62 may be rotated to such a position indicated in FIGS. 2 and 3 through the operation of the motor 46. In this position of the wheel units 62 the hand truck 10 can be utilized in the manner of a conventional hand truck. In order to achieve this mode of operation it is necessary that the hand truck 10 be constructed so that the output shaft 60 can be held or located in position with the wheel units located as indicated in FIGS. 2 and 3.

The shaft 60 may be held in place against rotation in many different ways. The gear box 56 described may be constructed so as to have sufficient internal friction so that the shaft 60 will not rotate as the hand truck 10 is used in a conventional hand truck manner. If desired, however, a conventional brake or lock 74 may be formed integrally with the gear box 56 for the purpose of holding the shaft 60 against rotation once it is in any specific position. A similar conventional shaft lock 76 may be provided as a part of the motor 46 for securing the shaft 50 against rotation. When the shaft 50 is secured against rotation the connected shaft 60 is also secured against rotation.

When a load 20 is placed generally against the frame 12 and upon the toe plate 26 as the hand truck 10 is used in a conventional manner the hand truck 10 may be tilted back to a position as indicated in FIG. 5 through the use of conventional handles 78 so that the truck 10 and the load 20 are supported by four of the individual wheels 70 on a horizontal surface 80. At times it may be necessary to operate the motor 46 in order to rotate the wheel units 62 in order to obtain a proper "balance" so that the load 20 and the truck 10 can be supported by the wheel units 62 as illustrated in FIG. 5. If in moving the truck 10 along a horizontal surface 80 an obstruction (not shown) should be encountered on such surface such as to preclude rotation of the wheels 70 the motor 46 may be operated so as to also rotate the wheel units 62 in synchronism so that they "step over" such an obstruction.

The wheel units 62 permit such a hand truck 10 and load 20 to be moved along a horizontal surface 80 and then up to a conventional stairs 82 having risers 84 and treads 86 as indicated in FIGS. 5 and 6 of the drawings. When wheels 70 on two of the wheel units 62 come in contact with a riser 84 the motor 46 may be operated so as to cause rotation of these wheel units 62 so as to bring adjacent wheels 70 on the wheel units 62 into contact with the tread 86 immediately adjacent to such a riser 84. By comparatively simple manipulation of the hand truck 10 this type of action may be continued with the wheel units 62 moving to successive positions as indicated in phantom in FIG. 6 so as to move the hand truck 10 and load 20 up the stairs 82. The reverse method of operation can, of course, be employed in moving the hand truck 10 and the load 20 down the stairs 82.

At all times during the use of the hand truck 10 in connection with any stairs such as the stairs 82 an individual utilizing the hand truck 10 must, of course, to a degree manipulate and control the position and movement of the hand truck 10. This is normally achieved through the use of the handles 78. Concurrently such an individual must, of course, operate the controls 42 so as to regulate the operation of the motor 46 as is necessary to cause rotation of the wheel units 62.

In order to achieve the mode of operation indicated in the preceding the dimensions of the wheel units 62 relative to the position of the output shaft 60 is quite important with the invention. The diameters of the wheels 70 as well as the distances of the axes of these wheels 70 from the axis of the shaft 60 must be related to one another and to the dimensions of the arms 68 so that in effect the individual arms 68 will "straddle" the intersections between treads 86 and risers 84 on common, conventional stairs such as the stairs 82. The type of action described can be achieved with various different wheel units 62 having different numbers of arms 68 and wheels 70.

It is preferred to form these wheel units 62 utilizing four arms 68 and four wheels 70 on each as shown since wheel units 62 constructed in this manner are effective for their intended purpose and are relatively inexpensive to construct. It is considered that the cost of constructing the wheel units 62 would be unnecessarily increased by using more than four arms 68 and wheels 70 in connection with each wheel unit 62. If a lesser number of arms 68 and wheels 70 were used with the hand truck 10 it is considered that it would be somewhat more difficult to utilize the hand truck 10 in the manner described.

The hand truck 10 is considered to be especially advantageous in that it can be utilized in a wide variety of different manners for a wide variety of different purposes. As shown in FIG. 7 this hand truck 10 may be utilized in supporting a conventional wheelchair 88 upon an enlarged or elongated toe plate 26' as previously described. Such a wheelchair 88 should, of course, be attached to the frame 12 as, for example, through the use of a strap 90 extending around the frame 12 to prevent its inadvertent movement. If desired a a seat such as a so-called jump seat 92 can be mounted directly upon the frame 12 in any convenient manner as shown in FIG. 8. The hand truck 10 is considered to be particularly advantageous in that it can be utilized in either of the manners indicated in FIGS. 7 and 8 in meeting a need for a hand truck or related device for moving incapacitated individuals both up and down stairs.

I claim:

1. In a hand truck having an elongated, vertically extending body, said body having upper and lower ends, a front and a back, toe plate means attached to said body at the front thereof adjacent to the lower end thereof for supporting a load, wheel means for supporting said body connected to said body adjacent to the lower end thereof and adjacent to the back thereof, and handle means connected to said body adjacent to the upper end thereof for use in manipulating said hand truck in which the improvement comprises:

said wheel means consisting of two separate, identical wheel units, one of said wheel units being located adjacent to one side of said body and the other of said wheel units being located adjacent to the other side of said body, each of said wheel units consisting of a centrally located hub section, four arms spaced from one another so as to extend outwardly from said hub section, and a wheel rotatably mounted on each of said arms, said wheels being free to rotate on said arms at all times, means connecting said hub sections of said wheel units so that said wheel units are both capable of rotating about an axis, said wheels being spaced equidistant from one another around said axis and equidistant from said axis, said wheels also being mounted on said arms so as to be capable of rotating about individual axes which are parallel to said axis, said wheels being lcoated with respect to said axis and said arms and said wheels being dimensioned so that during the use of said hand truck separate wheels on each of said wheel units are capable of being engaged by the riser and tread of a stair and so that when said wheel units are so engaged said wheel units can be rotated about said axis so as to locate other wheels on said wheel units on an adjacent tread of said stairs, motor means for simultaneously rotating both of said wheel units, gear box means coupling said wheel units to said motor means, said gear box means having sufficient internal friction so as to normally hold said wheel units against rotation except during operation of said motor means, said motor means being capable of being operated so as to turn said wheel unit so that arms of said wheel units extend vertically generally parallel to the back of said body to a position such that said hand truck may be supported substantially vertically by two of said wheels on a horizontal surface, and said motor means being capable of being operated so as to turn said wheel unit to a position such that said truck may be supported by four of said wheels on a horizontal surface with said body in other than a vertical position.

* * * * *